US011023031B2

(12) United States Patent
Sakai et al.

(10) Patent No.: US 11,023,031 B2
(45) Date of Patent: Jun. 1, 2021

(54) IMAGE PROCESSING APPARATUS, METHOD AND COMPUTER-READABLE MEDIUM

(71) Applicant: Brother Kogyo Kabushiki Kaisha, Aichi (JP)

(72) Inventors: Katsunori Sakai, Toyokawa (JP); Mitsuru Nakamura, Nagoya (JP); Hajime Usami, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 108 days.

(21) Appl. No.: 15/939,424

(22) Filed: Mar. 29, 2018

(65) Prior Publication Data

US 2018/0284866 A1  Oct. 4, 2018

(30) Foreign Application Priority Data

Mar. 31, 2017 (JP) .............................. JP2017-070345

(51) Int. Cl.
*G06F 1/3234* (2019.01)
*H04N 1/00* (2006.01)
(Continued)

(52) U.S. Cl.
CPC .............. *G06F 1/325* (2013.01); *G06F 1/266* (2013.01); *G09G 5/003* (2013.01); *H04N 1/00885* (2013.01); *G09G 2330/02* (2013.01)

(58) Field of Classification Search
CPC ...................................................... G06F 1/266
See application file for complete search history.

(56) References Cited

U.S. PATENT DOCUMENTS

2006/0117195 A1* 6/2006 Niwa ..................... G06F 1/266
                                                            713/300
2006/0179335 A1   8/2006 Jang
(Continued)

FOREIGN PATENT DOCUMENTS

JP      2007-233852 A    9/2007
JP      2007-305062 A   11/2007
(Continued)

OTHER PUBLICATIONS

"USB PD Power Negotiations." Texas Instruments, Nov. 2016. Application Report—SLVA842. http://www.ti.com/lit/an/slva842/slva842.pdf. Accessed Oct. 18, 2019. (Year: 2016).*
(Continued)

*Primary Examiner* — Kim Huynh
*Assistant Examiner* — Joshua Neveln
(74) *Attorney, Agent, or Firm* — Banner & Witcoff, Ltd.

(57) ABSTRACT

An image processing apparatus, including a power source, an image engine, an interface to communicate with an external device and deliver power from the power source to the external device, and a controller, is provided. The controller is configured to detect connection of the external device to the interface; receive power information, including a value of regular operable power and a value of minimum operable power, from the external device; receive a job execution command; in response to receiving the job execution command, determine whether a first power value including the value of the regular operable power exceeds a value of power available for the external device during a predetermined operation by the image engine; and in response to a determination that the first power value exceeds the value of power available for the external device, control the power source to deliver the minimum operable power to the external device.

24 Claims, 7 Drawing Sheets

(51) Int. Cl.
  *G09G 5/00*   (2006.01)
  *G06F 1/26*   (2006.01)

(56) References Cited

U.S. PATENT DOCUMENTS

| | | |
|---|---|---|
| 2007/0263250 A1 | 11/2007 | Koiwai |
| 2008/0162955 A1 | 7/2008 | Shimizu |
| 2014/0208134 A1* | 7/2014 | Waters .................. G06F 13/385 |
| | | 713/310 |
| 2015/0264208 A1* | 9/2015 | Achiwa .................. G06F 1/266 |
| | | 358/1.15 |
| 2016/0282925 A1* | 9/2016 | Ajiro ..................... G06F 1/3212 |
| 2017/0017283 A1 | 1/2017 | Seo |

FOREIGN PATENT DOCUMENTS

| | | |
|---|---|---|
| JP | 2008-165533 A | 7/2008 |
| JP | 2015-174374 A | 10/2015 |
| JP | 2015-174377 A | 10/2015 |
| JP | 2015-176442 A | 10/2015 |

OTHER PUBLICATIONS

Jan. 26, 2021—(JP) Notice of Reasons for Refusal—App 2017-070345, Eng Tran.

* cited by examiner

| | Power(W) |
|---|---|
| Operable power for printing | 250 |
| Operable power for scanning | 200 |
| Operable power for copying | 300 |
| Maximum power available from power source | 320 |

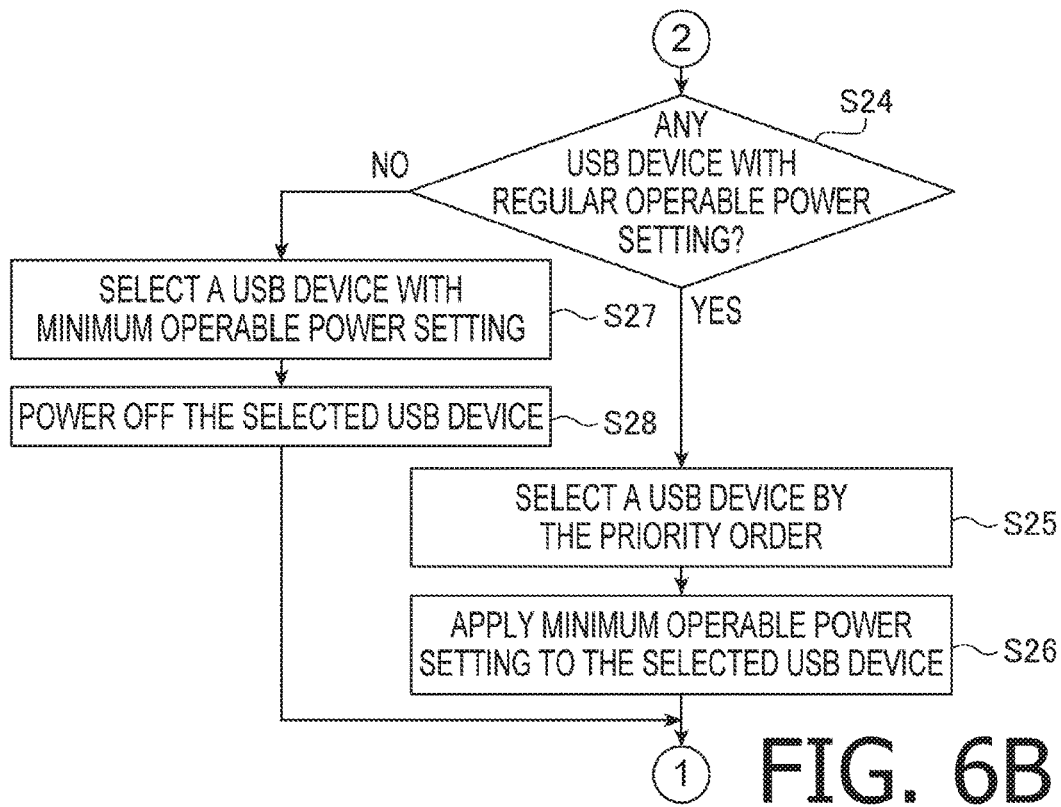

FIG. 6B

| For Scanning (200W) | Regular Setting |
|---|---|
| USB Device A | Regular Operable Power (40W) |
| USB Device B | Regular Operable Power (30W) |
| USB Device C | Regular Operable Power (15W) |
| Summed Power (W) | 285 |
| Availability | A |

FIG. 7

| For Printing (250W) | Regular Setting | First Modified Setting |
|---|---|---|
| USB Device A | Regular Operable Power (40W) | Minimum Operable Power (10W) |
| USB Device B | Regular Operable Power (30W) | Regular Operable Power (30W) |
| USB Device C | Regular Operable Power (15W) | Regular Operable Power (15W) |
| Summed Power (W) | 335 | 305 |
| Availability | N/A | A |

FIG. 8

| For Copying (300W) | Regular Setting | First Modified Setting |
|---|---|---|
| USB Device A | Regular Operable Power (40W) | Minimum Operable Power (10W) |
| USB Device B | Regular Operable Power (30W) | Regular Operable Power (30W) |
| USB Device C | Regular Operable Power (15W) | Regular Operable Power (15W) |
| Summed Power (W) | 385 | 355 |
| Availability | N/A | N/A |

| Second Modified Setting | Third Modified Setting |
|---|---|
| Minimum Operable Power (10W) | Minimum Operable Power (10W) |
| Minimum Operable Power (10W) | Minimum Operable Power (10W) |
| Regular Operable Power (15W) | Minimum Operable Power (10W) |
| 335 | 330 |
| N/A | N/A |

| Fourth Modified Setting |
|---|
| Minimum Operable Power (10W) |
| Off-Power Delivery (0W) |
| Minimum Operable Power (10W) |
| 320 |
| A |

FIG. 9

| For Printing (250W) | Regular Setting | First Modified Setting |
|---|---|---|
| USB Device A | Regular Operable Power (40W) | Minimum Operable Power (10W) |
| USB Device B | Regular Operable Power (30W) | Regular Operable Power (30W) |
| USB Device C | Regular Operable Power (15W) | Regular Operable Power (15W) |
| Summed Power (W) | 335 | 305 |
| Availability | N/A | A |

| Second Modified Setting | Third Modified Setting |
|---|---|
| Regular Operable Power (40W) | Regular Operable Power (40W) |
| Minimum Operable Power (10W) | Regular Operable Power (30W) |
| Regular Operable Power (15W) | Minimum Operable Power (10W) |
| 315 | 330 |
| A | N/A |

FIG. 10

IMAGE PROCESSING APPARATUS, METHOD AND COMPUTER-READABLE MEDIUM

CROSS REFERENCE TO RELATED APPLICATION

This application claims priority from Japanese Patent Application No. 2017-070345, filed on Mar. 31, 2017, the entire subject matter of which is incorporated herein by reference.

BACKGROUND

Technical Field

An aspect of the present disclosure is related to an image processing apparatus.

Related Art

An image processing apparatus capable of displaying a power-delivering condition thereof to deliver power to a plurality of external devices, which are connected thereto through a USB interface, is known. When, for example, a total amount of power combining power to be required in a printing operation and power to be distributed to the external devices exceeds a maximum amount of power that is deliverable by a power source of the image processing apparatus, the image processing apparatus may alert shortage of the power to a user through, for example, a user interface. The user may view the alert and modify power delivery settings of the external devices through the user interface.

SUMMARY

In this known image processing apparatus, however, the printing operation may not start but may be suspended until the user modifies the power delivery settings of the external devices through the user interface, and productivity in the image processing apparatus may be lowered.

The present disclosure is advantageous in that image processing apparatus capable of modifying settings of power to be delivered to external devices, which are connected thereto, automatically without suspending a required operation, and of preventing reduction of productivity, is provided.

According to an aspect of the present disclosure, an image processing apparatus, having a power source; an image engine including at least one of a print engine and a scan engine; an interface configured to communicate with an external device when the external device is connected to the interface, the interface being configured to deliver power from the power source to the external device; and a controller, is provided. The controller is configured to detect connection of the external device to the interface; receive power information from the external device through the interface, the power information including a value of regular operable power and a value of minimum operable power being smaller than the regular operable power; receive a job execution command; in response to receiving the job execution command, determine with reference to the power information whether a first power value exceeds a value of power available for the external device during a predetermined operation by the image engine, the first power value including the value of the regular operable power; and in response to a determination that the first power value exceeds the value of power available for the external device during the predetermined operation by the image engine, control the power source with reference to the value of the minimum operable power to deliver the minimum operable power to the external device.

According to another aspect of the present disclosure, a method to control an image processing apparatus having a power source, an image e including at least one of a print engine and a scan engine, an interface configured to communicate with an external device when the external device is connected to the interface and deliver power from the power source to the external device, and a controller, is provided. The method includes detecting connection of the external device to the interface; receiving power information from the external device through the interface, the power information including a value of regular operable power and a value of minimum operable power being smaller than the regular operable power; receiving a job execution command; in response to receiving the job execution command, determining with reference to the power information whether a first power value exceeds a value of power available for the external device: during a predetermined operation by the image engine, the first power value including the value of the regular operable power; and in response to a determination that the first power value exceeds the value of power available for the external device during the predetermined operation by the image engine, controlling the power source with reference to the value of the minimum operable power to deliver the minimum operable power to the external device.

According to still another aspect of the present disclosure, a non-transitory computer readable medium storing computer readable instructions that are executable by a computer in an information processing apparatus, having a power source, an image engine including at least one of a print engine and a scan engine, and an interface configured to communicate with an external device when the external device is connected to the interface and deliver power from the power source to the external device, is provided. The computer readable instructions, when executed by the computer, cause the computer to detect connection of the external device to the interface; receive power information from the external device through the interface, the power information including a value of regular operable power and a value of minimum operable power being smaller than the regular operable power; receive a job execution command; in response to receiving the job execution command, determine with reference to the power information whether a first power value exceeds a value of power available for the external device during a predetermined operation by the image engine, the first power value including the value of the regular operable power; and in response to a determination that the first power value exceeds the value of power available for the external device during the predetermined operation by the image engine, control the power source with reference to the value of the minimum operable power to deliver the minimum operable power to the external device.

BRIEF DESCRIPTION OF THE ACCOMPANYING DRAWINGS

FIG. 5 illustrates an operable power table for USB devices connected to the MFP according to the embodiments of the present disclosure.

FIGS. 6A-6B are flowcharts to illustrate a flow of steps in a USB power delivery setting process to be executed in the MFP according to first embodiment of the present disclosure.

FIG. 7 illustrates a USB power delivery setting table for USB for scanning in the MFP according to a first embodiment of the present disclosure.

FIG. 8 illustrates a USB power delivery setting table for printing in the MFP according to the first embodiment of the present disclosure.

FIG. 9 illustrates a USB power delivery sating table for copying the MFP according to the first embodiment of the present disclosure.

FIG. 10 illustrates a power delivery setting table for printing the MFP according to a second embodiment of the present disclosure.

DETAILED DESCRIPTION

Hereinafter, described below with reference to the accompanying drawings will be embodiments of the present disclosure.

First Embodiment

<Overall Configuration of the MFP>

Figure 1:
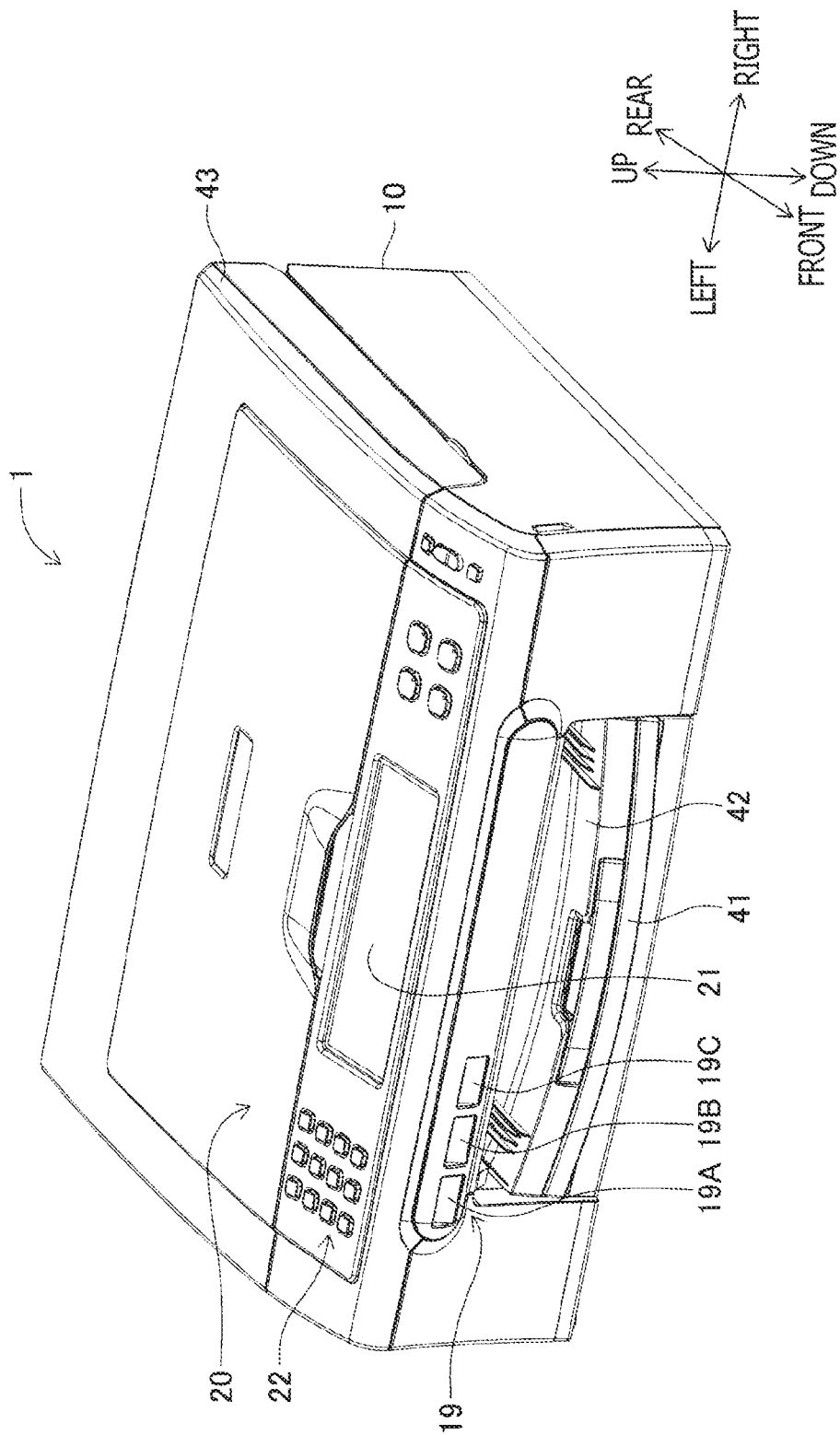
FIG. 1 is a perspective view of a multi-function peripheral (MFP) according to embodiments of the present disclosure.

An MFP 1 according to a first embodiment of the present disclosure is equipped with multiple functions, which may include, for example, a printing function, a copying function, and a scanning function. As shown in FIG. 1, the MFP 1 includes a housing 10, a USB interface 19, a user interface 20, a feeder tray 41, an ejection tray 42, and an upper cover 43. In the following description, directions related the MFP 1 and each part or item included in the MFP 1 will be mentioned on basis of a user's position to ordinarily use the MFP 1. For example, in FIG. 1, a viewer's lower-left side and upper-right side will be referred to as the user's frontward side and rearward side, respectively. A viewer's upper-left side and lower-right side in FIG. 1 will be referred to as a leftward side and a rightward side for the user to use the MFP 1, respectively. An up-to-down or down-to-up direction for the user may be referred to as a vertical direction. Optionally, the MFP 1 may be equipped with a facsimile communication function, which enables data exchange with another facsimile communication machine through a telephone line (not shown).

The housing 10 has an approximate shape of a box and accommodates a CPU 12, a non-volatile RAM (NVRAM) 15, an image printer 16 (see FIG. 2), which will be described later in detail, inside. The user interface 20 is arranged on a top face on a frontward side of the housing 10. The user interface 20 includes a touch panel 21 and operation buttons such as numerical keys 22. The USB interface 19 is arranged on a front face on an upper side of the housing 10. The USB interface 19 in the present embodiment includes three (3) receptacles 19A, 19B, 19C, which are in compliant with the Universal Serial Bus (USB) standard.

At a lower position in the housing 10, arranged is the feeder tray 41 to store sheets. The user may draw the feeder tray 41 frontward and set the sheets in the feeder tray 41. At an upper position with respect to the feeder tray 41, arranged is the c tray 42 to support the sheets with images printed thereon. The upper cover 43 includes a pivot shaft (not shown), which enables the upper cover 43 to pivot upward, at a rearward position. At a position underneath the upper cover 43, arranged is a platen (not shown). The user may pivot the upper cover 43 upward and place a master copy on the platen so that an image reader 17 (see FIG. 2) may read or scan an image of the master copy. The MFP 1 is powered to be operable by power from a commercial power source delivered through a power line (not shown) to a power source 25 (see FIG. 2).

Figure 2:
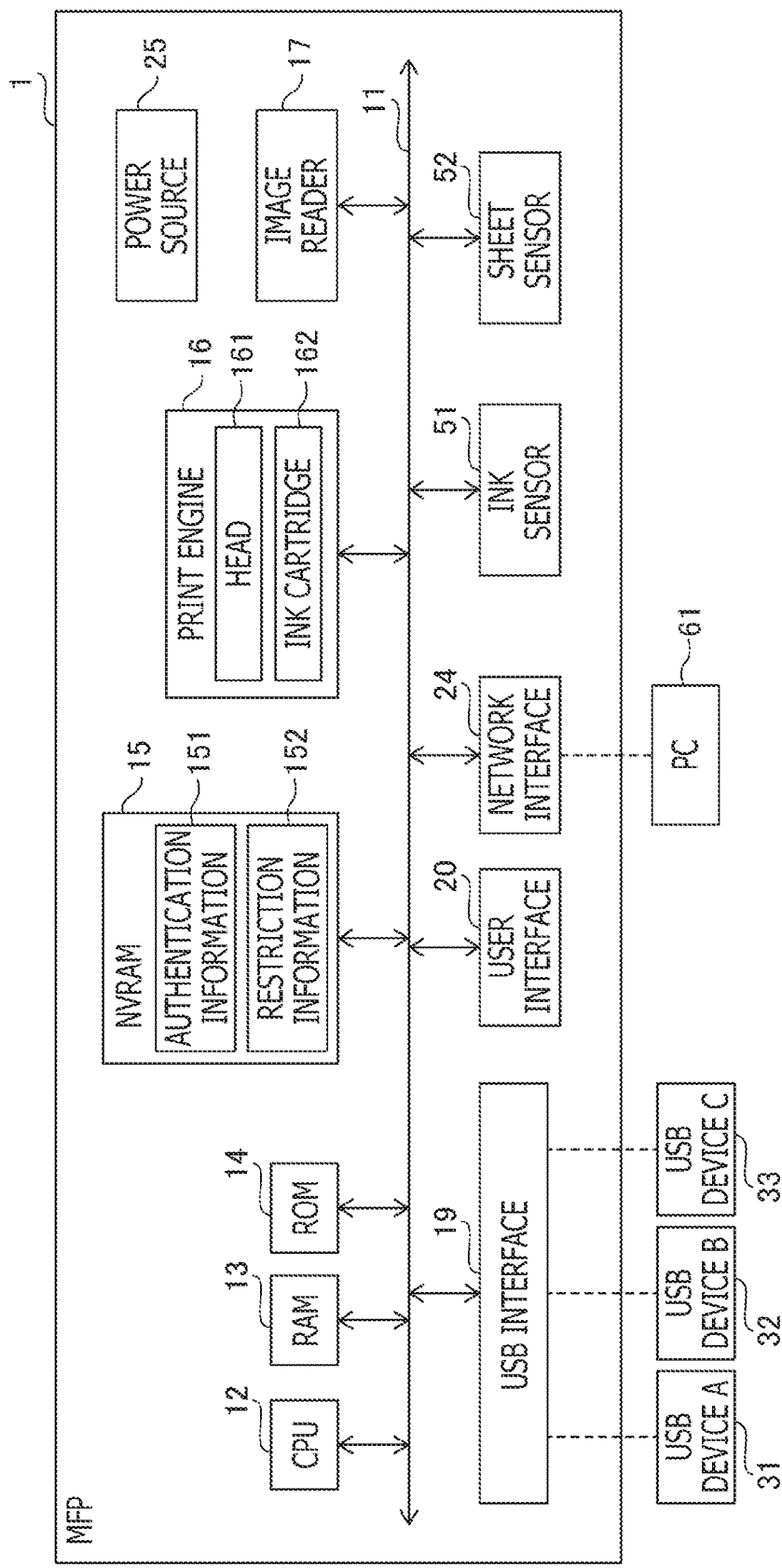
FIG. 2 is a block diagram to illustrate an electrical configuration in the MFP according to the embodiments of the present disclosure.

With reference to FIG. 2, described below will be an electrical configuration of the MFP 1. The MFP 1 includes the CPU 12, a RAM 13, a ROM 14, the NVRAM 15, the print engine 16, the image reader 17, the USB interface 19, the user interface 20, a network interface 24, the power source 25, an ink sensor 51, and a sheet sensor 52, which are connected with one another through busses 11.

Figures 3, 4:
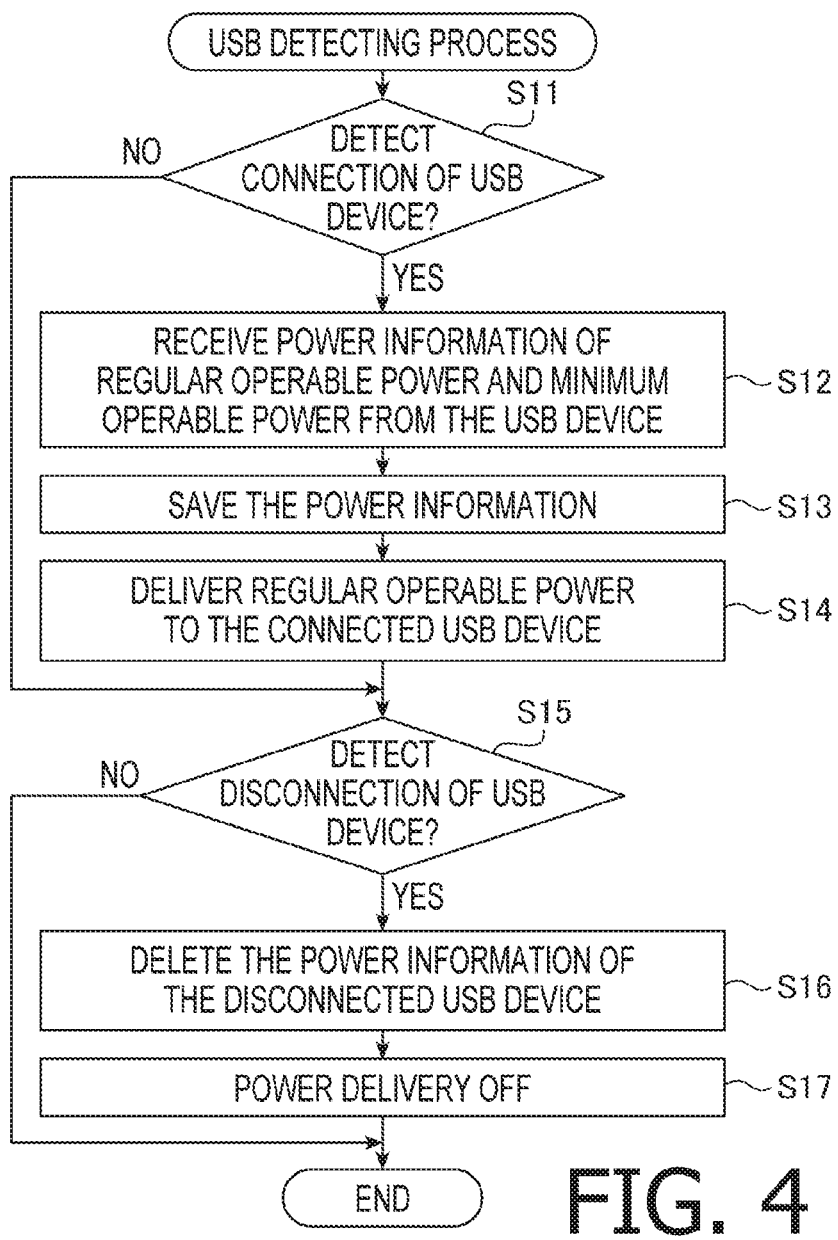
FIG. 3 illustrates a power consumption/supply table stored in a ROM in the MFP according to the embodiments of the present disclosure.
FIG. 4 is a flowchart to illustrate a flow of steps in a USB detecting process to be executed in the MFP according to the embodiments of the present disclosure.

The ROM 14 stores various types of data, including programs to be executed in the MFP 1 and a power consumption/supply table 111 (see FIG. 3). The power consumption/supply table 111 contains information regarding operable power, which is amounts of power required in a printing operation, a scanning operation, and a copying operation, and maximum power available from the power source 25. For example, as shown in FIG. 3, the power consumption/supply table 111 may contain 250 W for "operable power for printing," which indicates power required in a printing operation. In other words, 250 W of power is required for a printing operation in the MFP 1. For "operable power for scanning," which indicates power required in a scanning operation, the power consumption/supply table 111 may contain 200 W; and for "operable power for copying," which indicates power required in a copying operation, the power consumption/supply table 111 may contain 300 W In other words, 200 W of power and 300 W of power are required for a scanning operation and for a copying operation, respectively, in the MFP 1. Further, for "maximum power available from power source," which indicates a maximum power amount available from the power source 25, the power consumption/supply table 111 may contain 320 W. In other words, 320 W of power may be deliverable form the power source 25.

The CPU 12 (see FIG. 2) may read the programs from the ROM 14 to execute the programs and store outcomes of computation in the RAM 13 to control the parts connected through the busses 11. The NVRAM 15 may store information including authentication information 151, restriction information 152, and image data.

The print engine 16 may process the image data and form an image corresponding to the image data on a sheet in an inkjet-printing technique according to commands from the CPU 12. In the following description, forming an image on a sheet may be equated with printing. The print engine 16 includes a head 161 and an ink cartridge 162. The ink cartridge 162 may contain ink. The head 161 may discharge the ink supplied from the ink cartridge 162 at a sheet. The image reader 17 includes a platen to set a master copy and a contact image sensor (CIS), which are not shown. The image reader 17 may move the CIS with respect to the master copy placed on the platen to read an image of the master copy and generate image data. For example, the image reader 17 may be a scan engine.

The USB interface 19 may operate under the control of the CPU 12 to exchange data with a USB device A 31, a USB device B 32, and a USB device C 33, which are attached to the receptacles 19A, 19B, and 19C (see FIG. 1), respectively, in compliance with the USB standard. The USB interface 19 may deliver power to the USB devices A 31, B 32, C 33 connected to the receptacles 19A, 19B, 19C, respectively; in compliance with, for example, USB Power Delivery (USB-PD) standard under the control of the CPU 12. The USB devices A 31, B 32, and C 33 to be connected to the receptacles 19A, 19B, 19C in the first embodiment may include, for example, a mobile battery, a keyboard, a mouse, and a USB memory.

The user interface 20 may display, for example, a setting screen or information indicating a condition of the MFP 1 on the touch panel 21 (see FIG. 1) under the control of the CPU 12. The user interface 20 may, further, convey signals corresponding to operations entered by the user through the touch panel 21 or the numerical keys 22 (see FIG. 1) to the CPU 12. The network interface 24 includes an antenna, which is not shown, and may wirelessly communicate with an external device connected therewith through a local area network (NAN). The external device connected with the network interface 24 through the LAN may include, for example, a PC 61. Therefore, a user may manipulate the PC 61 to communicate with the MFP 1 through the LAN and the network interface 24.

The ink sensor 51 may be, for example, a light-transmission sensor to output signals corresponding to a remaining amount of the ink in the ink cartridge 162 to the CPU 12.

The power source 25 may convert the commercial power into direct-current power and distribute the converted power to each power-consuming devices in the MFP 1 through power lines (not shown) and to the USB devices A 31, B 32, C 33 through the USB interface 19.

The CPU 12 may detect connection with the USB devices A 31, B 32, C 33 through the USB interface 19 when the USB devices A 31, B 32, C 33 are connected to the receptacles 19A, 19B, 19C, respectively. Further, e CPU 12 may detect discontinuation of the connection with the USB devices A 31, B 32, C 33 when the USB devices A 31, B 32, C 33 are removed to the receptacles 19A, 19B, 19C, respectively. When, for example, USB devices A 31, B 32, C 33 are bus-powered devices, which may operate by power delivered from the power source 25, the CPU 12 may, as described later in detail, control the USB interface 19 to deliver power to the USB devices A 31, B 32, C 33 attached to the receptacles 19A, 19B, 19C, respectively (see FIGS. 6A-6B).

<Functions in the MFP>

The printing function in the MFP 1 may enable printing an image based on image data, which may be, for example received from the PC 61 through the network interface 24 or read from the USB memory through USB interface 19, in the print engine 16. The copying function in the MFP 1 may enable printing image data, which is generated in the image reader 17, in the print engine 16. The scanning function in the MFP 1 may enable outputting image data, which is generated in the image reader 17, to, for example, the PC 61 through the network interface 24 or to the USB memory through the USB interface 19 to be stored therein.

In order to implement these functions, the CPU 12 may control the print engine 16 to form an image of the image data, the image reader 17 to read a mater copy and generate the image data, or store the image data in the NVRAM 15, when the CPU 17 determines that a size of a usable area in the NVRAM 15 is larger than or equal to a predetermined size.

<USB Detesting Process>

Next, with reference to FIGS. 4-5, described below will be a USB detecting process, which is executed by the CPU 12 when one of the USB devices A 31, B 32, C 33 is attached to one of the receptacle 19A, 19B, 19C, and when one of the USB devices A 31, B 32, C 33 is detached from one of the receptacle 19A, 19B, 19C. The CPU 12 may repeat the USB detecting process periodically once the power source 25 in the MFP 1 is powered and the power is supplied to the power-consuming devices in the MFP 1.

As shown in FIG. 4, in S11, the CPU 12 determines whether any USB device is connected to one of the receptacles 19A-19C. If no USB device connected to any of the receptacles 19A-19C is detected (S11: NO), the CPU 12 proceeds to S15.

If the CPU 12 detects a USB device connected to one of the receptacles 19A-19C (S11: YES), the CPU 12 proceeds to S12, and in S12, the CPU 12 receives power information from the newly connected USB device. The power information includes a value of regular operable power, which indicates an amount of power required by the newly connected USB device to operate regularly, and a value of minimum operable power, which indicates an amount of minimum power required by the newly connected USB device to at least stay powered.

In S13, the CPU 12 calls a USB operable poser table 112 (see FIG. 5) from the NVRAM 15 and saves the values of "regular operable power" and "minimum operable power" for the newly connected USB device in the USB operable power table 112. The CPU 12 stores the USB operable power table 112 with the newly saved data back in the NVRAM 15. The USB operable power table 112 may contain, as shown in FIG. 5, a set of items (columns), for "reference," "regular operable power (W)," "minimum operable power (W)," and "off-power delivery (W)" for each of the USB devices connected to the receptacle 19A-19C.

Fields in the column "reference" may contain identifiers assigned to the USB devices A-C connected through the receptacle 19A-19C. For example, a reference item "USB device A" may represent the USB device A 33 connected to the receptacle 19A, and a reference name "USB device A" may be stored in one of the fields in the column "reference." A reference item "USB device B" may represent the USB device B 32 connected to the receptacle 19B, and a reference item "USB device C" may represent the USB device C 33 connected to the receptacle 19C; and reference names "USB device B" and "USB device C" may be stored in the other fields in the column "reference."

Fields in the column "regular operable power (W)" may contain values of the regular operable power received from the USB devices, which are represented by the reference names assigned thereto. Fields in the column "minimum operable power (W)" may contain values of the minimum operable power received from the USB devices, which are represented by the reference names assigned thereto. Fields in the column "off-power delivery (W)" may contain values, which indicate amounts of the power to be delivered to the USB devices connected to the receptacles 19A-19C when the connection with the USB devices is discontinued. The values in the column "off-power delivery (W)" may be zero ("0").

For example, when the CPU 12 detects connection with the USB device A 33 through the receptacle 19A, the CPU 12 may assign a reference name "USB device A" to the USB device A 33. The CPU 12 may receive power information, including a value "40" for the regular operable power and a value "10" for the minimum operable power. The CPU 12 may save the value "40" in the column "regular operable power (W)" and the value "10" in the column "minimum operable power (W)" in a row of the reference item "USB device A" to update the USB operable power table 112. The CPU 12 may store the updated USB operable power table 112 in the NVRAM 15.

Following S13, in S14 (see FIG. 4), the CPU 12 reads the value in the column "regular operable power (W)" in the USB operable table 112 in the row of the reference item representing the USB device connected in S11. Further, the CPU 12 delivers power indicated by the value read from the column "regular operable power (W)" to the USB device connected to the receptacle 19A, 19B, or 19C, which corresponds to the reference item of the USB device connected in S11.

For example, when the reference name assigned to the USB device A 33 connected in S11 is "USB device A," the CPU 12 reads the value "40 (W)" for the regular operable power in the row of the reference item "USB device A" from the USB operable power table 112 (see FIG. 5), and the CPU 12 may deliver power of 40 W to the USB device A 33 connected to the receptacle 19A, which corresponds to the reference item "USB device A."

Following S14, in S15 (see FIG. 4), the CPU 12 determines whether any of the USB devices is detached from the receptacles 19A, 19B, 19C. In other words, the CPU 12 determines whether connection with any of the USB devices is discontinued. If no discontinuation of the connection is detected in any of the receptacles 19A, 19B, 19C (S15: NO), the CPU 12 ends the USB detecting process.

On the other hand, if discontinuation of the connection with any of the USB devices is detected (S15: YES), the CPU 12 proceeds to S16. In S16, the CPU 12 updates the values in the columns "regular operable power (W)" and "minimum operable power (W)" in the USB operable power table 112 in the row of the reference item representing the USB device disconnected in S15 by a value "0 (W)," In other words, the CPU 12 deletes the values in the columns "regular operable power (W)" and "minimum operable power (W)," which were in the power information received from the currently disconnected USB device and stored in the USB operable table 112 when connection with the USB device was detected in S11, from the USB operable table 112. Therefore, no more power is delivered to the disconnected USB device.

For example, connection with the USB device A 33 with the reference name "USB device A" may be discontinued. The CPU 12 may rewrite the values in the columns "regular operable power (W)" and "minimum operable power (W)" in the USB operable table 112 in the row of the reference item "USB device A" by a value "0 (W)," In other words, the CPU 12 may delete the values in the column "regular operable power (W)" and "minimum operable power (W)," which were in the power information received from the USB device A 33 with represented by the reference name "USB device A" and stored in the USB operable table 112 when connection with the USB device A 33 was detected, from the USB operable table 112.

Following S16, in S17, the CPU 12 switches the power to be delivered to the receptacle 19A, 19B, or 19C, corresponding to the reference item assigned to the disconnected USB device, to 0 W. In other words, the CPU 12 switches off the power to be delivered to the receptacle 19A, 19B, or 19C, in which the discontinuation of the connection with the USB device was detected. The CPU 12 ends the process threat.

For example, connection with the USB device A 33 with the reference name "USB device A" assigned thereto may be discontinued, and the CPU 12 may switch the power to be delivered to the receptacle 19A corresponding to the reference item "USB device A" to 0 W and end the USB detecting process.

<USB Power Delivery Setting Process>

Next, with reference to FIGS. 6-9, described below will be a USB power delivery selling process, which is executed by the CPU 12 in order to set operating power to be delivered to the USB devices A 31-C 33 connected to the receptacles 19A-19C, when printing, scanning, or copying is conducted. The CPU 12 may repeat the USB power delivery setting process periodically once the power source 25 in the MFP 1 is powered and the power is supplied to the power-consuming devices in the MFP 1.

Figures 5, 6A:
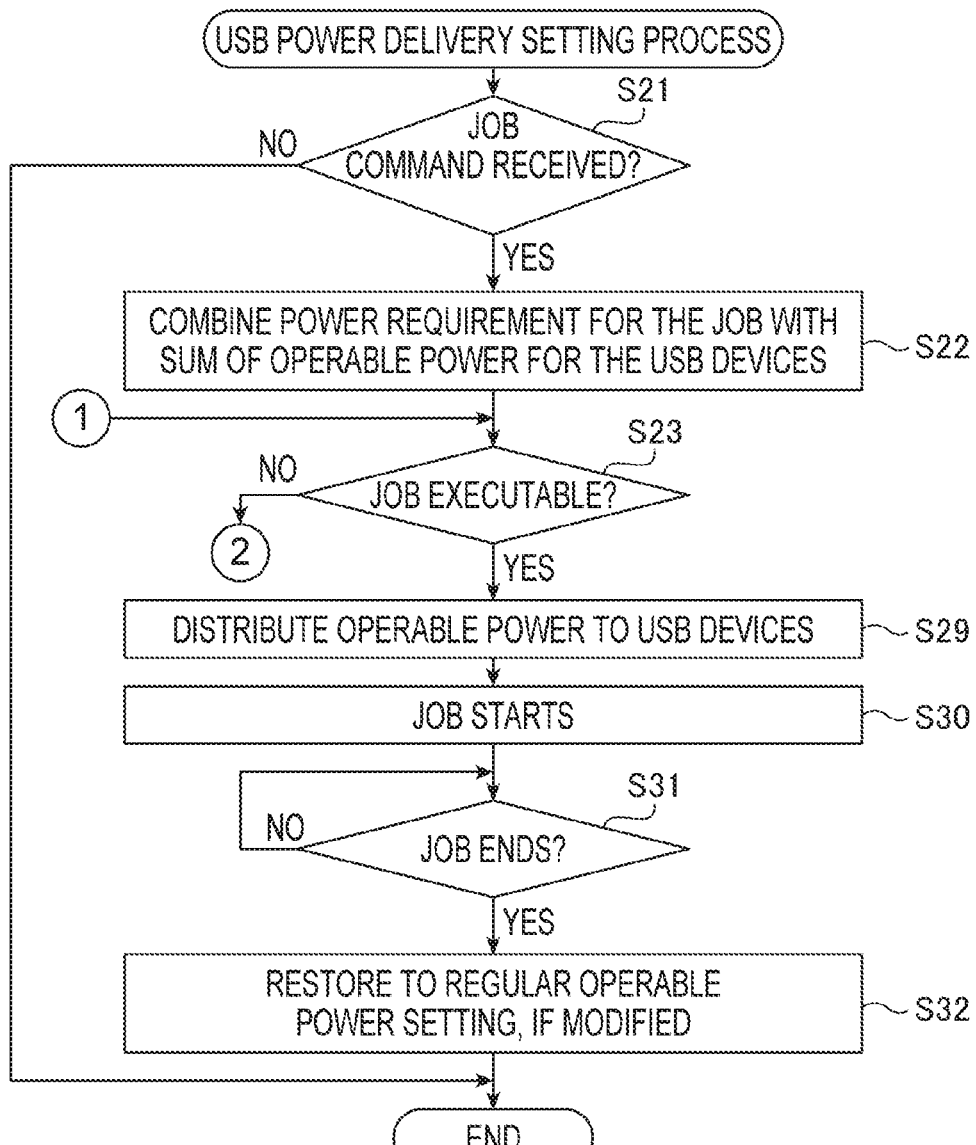

In S21, as shown in FIG. 6A, the CPU 12 determines whether one of a printing command for executing a printing operation, a scanning command for executing a scanning operation, and a copying command for executing a copying operation from the user is received through the touch panel 21 and/or operation buttons such as the numerical keys 22 in the user interface 20 or from the PC through the network interface 24. If none of the printing command, the scanning command, or the copying command is received (S21: NO), the CPU 12 ends the USB power delivery setting process.

On the other hand, if the CPU 12 determines that any of the printing command, the scanning command, and the copying command is received (S21: YES), the CPU 12 proceeds to S22. In S22, the CPU 12 refers to the power consumption/supply table 111 (see FIG. 3) and reads operating power required to execute a job corresponding to the received command.

Meanwhile, when the CPU 12 is free from a job, in other words, when no job is being executed, the CPU 12 may deliver power corresponding to the values stored in the column "regular operable power (W)" in the USB operable power table 112 (see FIG. 5) corresponding to the USB devices connected to the receptacles 19A-19C. Therefore, the CPU 12 reads the values in the column "regular operable power (W)" in the USB operable power table 112 in the rows of the reference items "USB device A." "USB device B," and "USB device C" and stores the read values in fields in a column "regular setting" in a USB power delivery setting table 115 (see FIG. 7) in the rows of the reference items "USB device A." "USB device B," and "USB device C" so that the power corresponding to "regular operable power (W)" may be delivered to the USB devices A 33, B 32, C 33.

Further in S22, the CPU 12 combines the value of the operable power required in the job with the values of the regular operable power (W) for the USB devices A 31-C 33. The CPU 12 stores the sum of the values in the column "regular setting" in a row "summed power (W)" in the USB power delivery setting table 115, as shown in FIG. 7. The CPU 12 may store the USB power delivery setting table 115 in the RAM 13.

Following S22, in S23, the CPU 12 refers to the USB power delivery setting table (see, for example, FIG. 7) stored in the RAM 13 to read the value in the column "regular setting" in the row "summed power (W)" and refers to the power consumption/supply table 111 (see FIG. 3) to read the value in the column "power (W)" in the row "maximum power available from power source." Based on these read values, the CPU 12 determines whether the value of the power for the "regular setting" for the row "summed power (W)" in the USB power delivery setting table is smaller than or equal to the value in the row "maximum power available from power source" in the power consumption/supply table 111. In other words, the CPU 12 determines whether the job is executable without changing the power delivery setting for the USB devices A 31-C 33 connected through the receptacles 19A-19C.

If the value of the power for "regular setting" corresponding to "summed power (W)" is smaller than or equal to the value of the power for "maximum power available by power source," in other words, if the job is executable under the current power delivery setting (S23: YES), the CPU 12 saves the values from the column "regular setting" as a "job-executing power delivery mode" in the RAM 13. Therefore, the regular setting, wherein the regular operable power (W) is delivered to the USB devices A 31, B 32, C 33 connected to the receptacles 19A, 19B, 19C, which are represented by the reference names "USB device A," "USB device B," "USB device C," is saved as the job-executing power delivery mode.

For example, if the job to execute is a scanning job, the CPU 12 may refer to the USB operable power table 11 (see FIG. 5) and read the values in the column "regular operable power (W)" in the rows of the reference items "USB device A," "USB device B," and "USB device C", which are, for example, 40 (W), 30 (W), and 15 (W), respectively. Thereafter, the CPU 12 may create a USB power delivery setting table 115 (see FIG. 7) and save the values 40 (W), 30 (W), 15 (W), which were read from the USB operable power table 112 (see FIG. 5), in the fields in the column "regular setting" in the rows of the reference items "USB device A," "USB device E," and "USB device C," respectively, in the USB power delivery setting table 115. The created USB power delivery setting table 115 may be stored in the RAM 13.

Thereafter, the CPU 12 may refer to the power consumption/supply table 111 (see FIG. 3) and read a value of the power to be required in the scanning job, i.e., a value in a row "operable power for scanning." The value in the row "operable power for scanning" may be, for example, as shown in FIG. 3, 200 (W). Next, the CPU 12 may refer to the USB power delivery setting table 115 (see FIG. 7) and read the values in the column "regular operable power (W)" in the rows of the reference items "USB device A," "USB device B," and "USB device C", which are 40 (W), 30 (W), and 15 (W), respectively. The CPU 12 may combine these values "200," "40," "30," and "15." The CPU 12 may store the summed value, e.g., 285 (W), in the USB power delivery setting table 115 (see FIG. 7), in the column "regular setting" in the row "summed power (W)." Thereafter, the CPU 12 may refer to the USB power delivery setting table 115 (see FIG. 7) to read the value "285 (W)" in the column "regular setting" in the row "summed power (W)" and refer to the power consumption/supply table 111 (FIG. 3) to read the value "320 (W)" in the column "power (W)" in the row "maximum power available by power source." The CPU 12 may compare these values (i.e., 285 v. 320).

Based on the comparison, the CPU 12 may determine that the value of the power for the "regular setting" corresponding to the "summed power (W)" is smaller than or equal to the value of the power for the "maximum power available from power source" (S23: YES), and the CPU 12 may save the values from the column "regular setting," in which the regular operable power of 40 W, 30 W, 15 W is delivered to the USB devices A 31, B 32, C 33, connected to the receptacles 19A, 19B, 19C, respectively, in the RAM 13 as the job-executing power delivery mode. Following S23, the CPU 12 may proceed to S29.

In S23, on the other hand, if the value of the power for the "regular setting" corresponding to the "summed power (W)" in the USB power delivery setting table is greater than the value of the "power (W)" corresponding to the "maximum power available from power source" in the power consumption/supply table 111 (see FIG. 3), in other words, if the value in the column "regular setting" in the row "summed power (W)" in the USB power delivery setting table exceeds the value in the column "power (W)" in the row "maximum power available from power source" (S23: NO), as shown in FIG. 6A, the CPU 12 proceeds to S24 (see FIG. 6B). In other words, if the power corresponding to the "regular operable power (W)" is to be delivered to the USB devices A 31, B 32, C 33 corresponding the reference items "USB device A," "USB device B," and "USB device C" while the job is being executed, the total power may exceed the maximum power available from the power source 25 (S23: NO). The CPU 12 may proceed to S24.

For example, if the job to execute is a printing job, the CPU 12 may refer to the USB operable power table 112 (see FIG. 5) and read the values in the column "regular operable power (W)" in the rows of the reference items "USB device A," "USB device B," and "USB device C", which are, for example, 40 (W), 30 (W), and 15 (W), respectively. The CPU 12 may create a USB power delivery setting table 116 (see FIG. 8) and save the values 40 (W), 30 (W), 15 (W), which were read from the USB operable power table 112 (see FIG. 5), in a column "regular setting" in the USB power delivery setting table 116.

Thereafter, the CPU 12 may refer to the power consumption/supply table 111 (see FIG. 3) and read a value of the power required in the printing job i.e., the value in the column "power (W)" in the row "operable power for printing." The value of the power required in the printing job may be, for example, as shown in FIG. 3, 250 (W).

The CPU 12 may refer to the USB power delivery setting table 116 (see FIG. 8) and read the values in the column "regular operable power (W)" in the rows of the reference items "USB device A," "USB device B," and "USB device C", which are 40 (W), 30 (W), and 15 (W), respectively. The CPU 12 may combine these values "250," "40," "30," and "15." The CPU 12 store the summed value, e.g., 335 (W), in the USB power delivery setting table 116 (see FIG. 8), in the column "regular setting" in the row "summed power (W)."

Thereafter, the CPU 12 may refer to the USB power delivery setting table 116 (see FIG. 8) to read the value "335 (W)" in the column "regular setting" in the row "summed power (W)" and refer to the power consumption/supply table 111 (FIG. 3) to read the value "320 W" in the column "maximum power available from power source." The CPU 12 may compare these values (i.e., 335 v. 320).

Based on the comparison, the CPU 12 may determine that the value of the power for the "regular setting" corresponding to the "summed power (W)" is greater than the value of the power for the "maximum power available from power source" (S23: NO), in other words, if the value of the power for the regular setting corresponding to the summed power (W) exceeds the value of the power (W) for the maximum power available from the power source 25 (S23: NO), as shown in FIG. 6A, the CPU 12 proceeds to S24 (see FIG. 6B).

In S24, the CPU 12 refers to the USB power delivery setting table and reads the values, which were set most recently in the fields in the column "regular setting" and in the rows of the reference items "USB device A," "USB device B," and "USB device C," to determine whether any of the values of the power in these fields indicates the regular operable power for the USB device A, B, or C. In other words, the CPU 12 determines whether any of the values of the power set most recently to the "USB device A," "USB device B," and "USB device C" in the USB power delivery setting table is equal to the value of the regular operable power in the USB operable power table 112 (see FIG. 5).

If the CPU 12 determines that any of the values of the power set most recently to the "USB device A," "USB device B," and "USB device C" in the USB power delivery setting table is equal to the value of the regular operable power in the USB operable power table 112 (S24: YES), the CPU 12 proceeds to S25. In S25, the CPU 12 selects one of the reference items "USB device A," "USB device B," and "USB device C," which corresponds to the field that contains the value of the power set most recently being equal to the value of the regular operable power, according to a predetermined order of priority.

In other words, while the USB devices A 31, B 32, C 33 may be supplied with either the regular operable power or the minimum operable power, the CPU 12 may select one of the USB devices A 31, B 32, C 33 which is supplied with the regular operable power, according to the order of priority while executing the job so that the setting of the power to be supplied to the selected one of the USB devices A 31, B 32, C 33 may be changed from the regular operable power to the minimum operable power.

The CPU 12 may set the order of priority based on largeness of difference between a value of the regular operable power (W) and a value of minimum operable power (W) for each reference item in the USB operable power table 112 (see FIG. 5). In other words, the USB device A 31, B 32, or C 33 corresponding to the reference item "USB device A," "USB device B," or "USB device C," in which the difference between the value in the column "regular operable power (W)" and the value in the column "minimum operable power (W)" is largest, is selected firstly; and the USB device A 31, B 32, or C 33 corresponding to the reference item "USB device A," "USB device B," or "USB device C," in which the difference between the value in the column "regular operable power (W)" and the value in the column "minimum operable power (W)" is smallest, is selected lastly.

For example, as shown in FIG. 5, a difference between the value of "regular operable power (W)" and the value of "minimum operable power (W)" in the row of the reference item "USB device A" may be 30 (W); a difference between the value of "regular operable power (W)" and the value of "minimum operable power (W)" in the row of the reference item "USB device B" may be 20 (W); and a difference between the value of "regular operable power (W)" and the value of "minimum operable power (W)" in the row of the reference item "USB device C" may be 5 (W). Therefore, according to the largeness of the differences, i.e., 30>20>5, the reference items "USB device A," "USB device B," and "USB device C" may be selected in this mentioned order. Meanwhile, the order of priority may not necessarily be set each time the CPU 12 reaches S25 but may be prepared and fixed in advance.

Following S25, in S26, as shown in FIG. 6B, the CPU 12 refers to the USB operable power table 112 (see FIG. 5) and reads the value in the column "minimum operable power (W)" in the row of the reference item selected in S25. With the value read from the USB operable table 112, the CPU 12 updates the field in the USB power delivery setting table in the row of the reference item, which was selected in S25. The CPU 12 saves the updated USB power delivery setting table in the RAM 13 and proceeds to S23 for another round.

For example, in S24, the CPU 12 may refer to the USB power delivery setting table 116 (see FIG. 8) and read the values, which were set most recently in the fields in the column "regular setting" and in the rows of the reference items "USB device A," "USB device B," and "USB device C." The CPU 12 may determine one or more of the values of the power in these fields indicates "regular operable power (W)" for the USB device A, B, or C (S24: YES). Among the power settings of "regular operable power (W)" for the reference hems "USB device A," "USB device B," and "USB device C," the reference item "USB device A," which is listed firstly in the order of priority, may be selected. Following this selection in S25, in S26, the CPU 12 may refer to the USB operable power table 112 (see FIG. 3) and read the value in the column "minimum operable power" in the row of the selected reference item "USB device A."

Thereafter, the CPU 12 may write the value 10 (W), which is the minimum operable power for the USB device A31, in a column "first modified setting" in the row of the reference item "USB device A." Further, the CPU 12 may write the values 30 (W) and 15 (W), which are the regular operable power for the USB devices B32 and C33, in the column "first modified setting" in the rows of the reference items "USB device B" and "USB device C."

Following S26, as shown in FIG. 6B, the CPU 12 returns to S23 for another round. In S23, the CPU 12 refers to the power consumption/supply table 111 (see FIG. 3) and reads a value of the power required in the printing job, i.e., the value in the column "power (W)" in the row "operable power for printing." The value of the power required in printing may be, for example, as shown in FIG. 3, 250 (W). Next, the CPU 12 refers to the USB power delivery setting table 116 and reads the values in the column "first modified setting" in the rows of the reference items "USB device A," "USB device B," and "USB device C," which are 10 (W) being the minimum operable power, 30 (W) being the regular operable power, and 15 (W) being the regular operable power, respectively. The CPU 12 combines these values 10, 15, 30 with the value of the power required in printing, i.e., 250 (W) and writes the summed value 305 (W) in the column "first modified setting" in the row "summed power (W)" in the USB power delivery setting table 116.

Thereafter, the CPU 12 refers to the USB power delivery setting table 116 to read the value "305 (W)" in the column "first modified setting" in the row "summed power (W)" and refers to the power consumption/supply table 111 (FIG. 3) to read the value "320 (W)" in the column "maximum power available from power source" to compare these values (i.e., 305 v. 320). The CPU 12 may determine that the value "305 (W)" in the column "first modified setting" in the row "summed power (W)" is smaller than the value "320 (W)" in the column "maximum power available from power source" (S23: YES). Accordingly, the CPU 12 saves these values "10 (W) being the minimum operable power for the reference item "USB device A," "30 (W)" being the regular operable power for the reference item "USB device B," and "15 (W)" being the regular operable power for the reference item "USB device C," from the column "first modified setting" in the RAM 13 as the job-executing power delivery mode. Following S23, the CPU 12 may proceed to S29.

On the other hand, in S24, as shown in FIG. 6B, if the CPU 12 determines that none of the values of the power set most recently to the reference items "USB device A," "USB device B," or "USB device C" in the USB power delivery setting table is equal to the values in the column "regular operable power (W)" in the USB operable power table 112

(see FIG. 5), in other words, if the CPU 12 determines all the values of the power for the reference items set in the most recent USB power delivery setting table are the values equal to "minimum operable power" (S24: NO), the CPU 12 proceeds to S27.

In S27, the CPU 12 selects one of the reference items "USB device A," "USB device B," and "USB device C," which correspond to the fields that contain the most recent values of the power being equal to the value of the minimum operable power, according to a second predetermined order of priority. In other words, while all of the USB devices A31, B32, C33 are supplied with the minimum operable power, the CPU 12 may select one of the USB devices A31, B32, C33 according to the second order of priority while the job is being executed so that the setting of the power to be supplied to the selected one of the USB devices A31, B32, C33 may be temporarily changed from the minimum operable power to none (0 W).

The CPU 12 may set the second order of priority based on largeness of a difference between a value of the "regular operable power (W)" and a value of the "minimum operable power (W)" for each reference item in the USB operable power table 112 (see FIG. 5). For example, as shown in FIG. 5, a difference between the value of "regular operable power (W)" and the value of "minimum operable power (W)" in the row of the reference item "USB device A" may be 30 (W); a difference between the value of "regular operable power (W)" and the value of "minimum operable power (W)" in the row of the reference item "USB device B" may be 20 (W); and a difference between the value of "regular operable power (W)" and the value of "minimum operable power (W)" in the row of the reference item "USB device C" may be 5 (W). Therefore, according to the largeness of the differences, i.e., 30>20>5, the reference items "USB device A," "USB device B," and "USB device C" may be listed in this mentioned order as the second order of priority. In this regard, meanwhile, some of the reference items corresponding to the USB devices, which may serve as an interface such as a keyboard, mouse, etc., or which may need to be connected with the power source 25 for a longer period of time, such as a mobile battery, may be listed at the end of the second order of priority.

Optionally in S27, the CPU 12 may prevent some of the USB devices, which may serve as interfaces such as a keyboard, mouse, etc., or the mobile battery which may be connected with the power source 25 for a longer period of time, from selecting. Optionally, the second order of priority may not necessarily be set each time the CPU 12 reaches S27 but may be prepared and fixed in advance. Optionally, when, for example, the values of the minimum operable power are unequal among the reference items "USB device A," "USB device B," "USB device C," the CPU 12 may set the second order of priority according to largeness of the values of the minimum operable power for the reference items "USB device A," "USB device B," and "USB device C."

Following S27, in S28, as shown in FIG. 6B, the CPU 12 updates the field in the USB power delivery setting table in the row of the reference item, which was selected in S27, by the value, "0 (W)," in the column "off-power delivery (W)" (see FIG. 5) in the row of the reference item selected in S27. The CPU 12 saves the updated USB power delivery setting table in the RAM 13 and returns to S23.

For example, a column "third modified setting" in the USB power delivery setting 117 (see FIG. 9) may contain values "10 (W)," "10 (W)," and "10 W," being minimum operable power for all of the reference items "USB device A," "USB device B," and "USB device C," respectively (S24: NO). In S27, the CPU 12 may select a first listed one of the reference items "USB device A," "USB device B," and "USB device C," according to the second order of priority. In the present embodiment, the USB device A 31 corresponding to the reference item "USB device A" is a device that may serve as an interface such as a keyboard, mouse, etc., or may be connected with the power source 25 for a longer period of time, such as a mobile battery. Therefore, the reference item "USB device A" may be listed at the end of the second order of priority. In other words, the second order of priority may list the reference items in an arrangement: "USB device B" firstly, "the USB device C" secondly, and "USB device A" lastly.

Following S27, in S28, the CPU 12 may write the value "0 (W)," which is the value of "off-power delivery" for the reference item "USB device B," in a column "fourth modified setting" in the row of the reference item "USB device B" in the USB power delivery setting table 117 (see FIG. 9). Further, the CPU 12 may write the values "10 (W)" and "10 (W)" in the column "fourth modified setting" for the rows of the reference items "USB device A" and "USB device C," respectively, in the USB power delivery setting table 117.

Following S28, the CPU 12 returns to S23 for another round. In S23, the CPU 12 refers to the power consumption/supply table 111 (see FIG. 3) and reads a value of the power required in a copying job, i.e., the value in the column "power (W)" in the row "operable power for copying." The value of the power required in copying may be, for example, as shown in FIG. 3, 300 (W). Next, the CPU 12 refers to the USB power delivery setting table 117 (see FIG. 9) and reads the values in the column "fourth modified setting" in the rows of the reference items "USB device A," "USB device B," and "USB device C," which are 10 (W) being the minimum operable power, 0 (W) being the amount of the off-power delivery, and 10 (W) being the minimum operable power, respectively. The CPU 12 combines these values "10," "0," "10" with the value of "operable power for copying," i.e., 300 (W), and writes the summed value 320 (W) in the column "fourth modified setting" in the row "summed power (W)" in the USB power delivery setting table 117 (see FIG. 9).

Thereafter, the CPU 12 refers to the USB power delivery setting table 117 to read the value "320 (W)" in the column "fourth modified setting" in the row "summed power (W)" and refers to the power consumption/supply table 111 (FIG. 3) to read the value "320 (W)" in the column "maximum power available from power source" to compare these values (i.e., 320 v. 302). The CPU 12 may determine that the value, e.g., "320 (W)," in the column "fourth modified setting" in the row "summed power (W)" is equal to the value, e.g., "320 W," in the column "maximum power available from power source" (S23: YES). Accordingly, the CPU 12 saves these values "10 (W) being the minimum operable power for the reference item "USB device A," "0 (W)" being the amount of the off-power delivery for the reference item "USB device B," and "10 (W)" being the minimum operable power for the reference item "USB device C," from the column "fourth modified setting" in the RAM 13 as the job-executing power delivery mode. Following S23, the CPU 12 proceeds to S29.

Following S23, in S29, as shown in FIG. 6A, the CPU 12 reads the values of the power to be delivered to the USB devices A 31, B 32, and C 33 corresponding the reference items "USB device A," "USB device B," and "USB device C," which were saved in the RAM 13 as the "job-executing power delivery mode" in S23, S26, or S28.

Based on the values saved as the job-executing power delivery mode, the CPU 12 delivers the power corresponding to the value for the reference item "USB device A" to the USB device A31, which is attached to the receptacle 19A corresponding to the reference item USB device A; the power corresponding to the value for the reference item "USB device B" to the USB device B32, which is attached to the receptacle 19B corresponding to the reference item USB device B; and the power corresponding to the value for the reference item "USB device C" to the USB device C32, which is attached to the receptacle 19C corresponding to the reference item USB device C, through the USB interface 19.

For example, the CPU 12 may read the values "40 (W)," "30 (W)," and "15 (W)" indicating the regular operable power set to the reference items "USB device A," "USB device B," and "USB device C" (see FIG. 7), which were saved in the RAM 13 as the job-executing power delivery mode in S23. The CPU 12 may deliver the power of 40 W, 30 W, and 15 W being the regular operable power to the USB devices A 31, B 32, and C 33 connected to the receptacles 19A, 19B, and 19C, which correspond to the reference items "USB device A," "USB device B," and "USB device C," respectively, through the USB interface 19.

For another example, the CPU 12 may read the values "10 (W)" indicating the minimum operable power set to the reference item "USB device A," "30 (W)" indicating the regular operable power set to the reference item "USB device B," and "15 (W)" indicating the regular operable power set to the reference item "USB device C" (see FIG. 8), which were saved in the RAM 13 as the job-executing power delivery mode in S26. The CPU 12 may deliver the power of 10 W being the minimum operable power, 30 W being the regular operable power, and 15 W being the regular operable power to the USB devices A 31, B 32, and C 33 connected to the receptacles 19A, 19B, and 19C, which correspond to the reference items "USB device A," "USB device B," and "USB device C," respectively, through the USB interface 19.

For another example, the CPU 12 may read the values "10 (W)" indicating the minimum operable power set to the reference item "USB device A," "0 (W)" indicating the amount of the off-power delivery set to the reference item "USB device B," and "10 (W)" indicating the minimum operable power set to the reference item "USB device C" (see FIG. 9), which were saved in the RAM 13 as the job-executing power delivery mode in S28. The CPU 12 may deliver the power of 10 W being the minimum operable power, 0 W being the amount of the off-power delivery; and 10 W being the minimum operable power to the USB devices A 31, B 32, and C 33 connected to the receptacles 19A, 19B, and 19C, which correspond to the reference items "USB device A," "USB device B," and "USB device C," respectively, through the USB interface 19.

Following S29, in S30, as shown in FIG. 6A, the CPU 12 starts executing the job corresponding to the command received in S21. The CPU 12 waits until the job is completed (S31: NO). When the job is completed (S31: YES), the CPU 12 proceeds to S32.

In S32, the CPU 12 reads the values of the power set to the reference items "USB device A," "USB device B," and "USB device C" saved in the RAM 13 as the job-executing power delivery mode in one of S23, S26, and S28. If any of the values is different from the values in the column "regular operable power (W)" in the USB operable power table 112 (see FIG. 5), in other words, if any of the values set to the reference items "USB device A," "USB device B," and "USB device C" has been changed from the values of "regular operable power (W)" temporarily in order to execute the job, the CPU 12 restores the values of the power to be delivered to the USB device to the values corresponding to "regular operable power (W)." Thereafter, the CPU 12 delivers the power being the regular operable power to the USB devices A 31, B 32, and C 33 connected to the receptacles 19A, 19E, and 19C, which correspond to the reference items "USB device A," "USB device B," and "USB device C," respectively. The CPU 12 ends the process threat.

According to the MFP 1 in the first embodiment described above, the sum of the values of the regular operable power received from the USB devices A 31-C 33, which are connected to the receptacles 19A-19C, and the value of the power required in the job for printing, scanning, or copying, may exceed the value of the power deliverable from the power source 25. If the summed value exceeds the value of the power deliverable from the power source 25, the power to be delivered to the USB devices A 31-C 33 connected to the receptacles 19A-19C may be automatically adjusted based on the information of the minimum operable power to the USB devices A 31-C 33 so that the USB devices A 31-C 33 may be supplied with the minimum operable power, and the power required in the job may be secured. Therefore, the operation for printing, scanning, or copying may not be suspended but may be executed so that productivity in the MFP 1 may be improved.

The CPU 12 may select one of the USB devices A 31, B 32, C 33, to which the minimum operable power is to be delivered, in sequence according to be order of priority, until the summed value, combining the value of the power required in printing, scanning, or copying with the value of the power to be delivered to the USB devices A 31-C 33 connected to the receptacles 19A-19C, does not exceed the value of the maximum power available from the power source 25. Therefore, even when multiple USB devices are connected to the receptacles 19A-19C, the operation for printing, scanning, or copying may not be suspended but may be executed so that productivity in the MFP 1 may be improved.

The CPU 12 may deliver the minimum operable power set to the USB devices A 31-C 33, which are connected to the receptacles 19A-19C, to the USB devices A 31-C 33 from the beginning of the operation for printing, scanning, or copying. Therefore, an ongoing operation for printing, scanning, or copying may not be suspended but may be continuously executed so that productivity in the MFP 1 may be improved.

Meanwhile, even if the values of the power to be delivered to the USB devices A 31-C 33 connected to the receptacles 19A-19C are set to the values corresponding to the minimum operable power, sum of the values of the power to be delivered to the USB devices and the value of the power required in the operation for printing, scanning, or copying may still exceed the value of the maximum power available from the power source 25. If the summed value exceeds the value of the maximum power available from the power source 25, the CPU 12 may select one of the USB devices A 31-C 33, to which the power delivery is to be suspended, in sequence according to the order of priority, until the summed value, combining the value of the power required in printing, scanning, or copying with the value of the power to be delivered to the USB devices A 31-C 33 connected to the receptacles 19A-19C, does not exceed the value of the maximum power available from the power source 25. Therefore, even when multiple USB devices A 31-C 33 are connected to the receptacles 19A-19C, the operation for printing, scanning, or copying may not be suspended but may be executed so that productivity in the MFP 1 may be improved.

The CPU 12 may set the order of priority, in which the USB devices A 31-C 33 may be selected in sequence, according to largeness of the difference between a value of "regular operable power (W)" and a value of "minimum operable power (W)" for each of USB devices A 31-C 33 connected to the receptacles 19A-19C. Therefore, power delivery to the USB devices A 31-C 33 connected to the receptacles 19A-19C may be suspended gradually and efficiently. Further, the CPU 12 may set the order of priority time-efficiently.

The CPU 12 may receive the power information, which includes the value of "regular operable power" and the value of "minimum operable power," through the USB interface 19 from each of the USB devices A 31-C 33 connected to the receptacles 19A-19C, and store the power information in the USB operable power table 112. Therefore, the CPU 12 may unfailingly store the values of the regular operable power and the values of the minimum operable power of the USB devices A 31-C 33 connected thereto.

The CPU 12 may detect discontinuation of connection with the USB devices A 31-C 33. When the CPU 12 detects the discontinuation, the CPU 12 may delete the power information, which includes the value of "regular operable power" and the value of "minimum operable power," received from the disconnected USB device A 31, B 32, or C 33 from the USB operable power table 112. Therefore, a volume of the NVRAM 15 in the MFP 1 may be efficiently downsized.

Second Embodiment

Next, with reference to FIG. 10, described below will be a second embodiment of the present disclosure. In the second embodiment, items or structures which are substantially the same as or similar to those described in the first embodiment may be denoted by the same reference signs, and description of those may be omitted.

The MFP 1 in the second embodiment may be configured to be similar to the MFP 1 in the first embodiment but is different from the MFP 1 in the first embodiment in some of the behaviors in S25-S26 (see FIG. 6B). As shown in FIG. 10, the CPU 12 in the MFP 1 may select the reference items "USB device A," "USB device B," and "USB device C," which are set to operate in the regular operable power, one by one in sequence according to the order of priority and set a value of the selected reference item each time for "first modified setting," "second modified setting," and "third modified setting."

The CPU 12 may set the order of priority to select the reference items "USB device A," "USB device B," and "USB device C" based on largeness of a difference between a value of "regular operable power (W)" and a value of "minimum operable power (W)" for each reference item in the USB operable power table 112 (see FIG. 5).

For example, as shown in FIG. 5, a difference between the value of "regular operable power (W)" and the value of "minimum operable power (W)" in the row of the reference item "USB device A" may be 30 (W); a difference between the value of "regular operable power (W)" and the value of "minimum operable power (W)" in the row of the reference item "USB device B" may be 20 (W); and a difference between the value of "regular operable power (W)" and the value of "minimum operable power (W)" in the row of the reference item "USB device C" may be 5 (W). Therefore, according to the largeness of the differences, i.e., 30>20>5, the reference items "USB device A," "USB device B," and "USB device C" may be selected in this mentioned order. Meanwhile, the order of priority may not necessarily be set each time the CPU 12 reaches S25 but may be prepared and fixed in advance.

Thereafter, the CPU 12 writes the value "10 (W)" indicating the minimum operable power for the reference item "USB device A," which is selected firstly according to the order of priority, in a column "first modified setting" in the row of the reference item "USB device A," in the USB power delivery setting table 121. Further, the CPU 12 writes the values "30 (W)" and "15 (W)," which are the regular operable power for the reference items "USB device B" and "USB device C," in the column "first modified setting" in the rows of the reference items "USB device B" and "USB device C."

Further, the CPU 12 writes the value "10 (W)" indicating the minimum operable power for the reference item "USB device B," which is selected secondly according to the order of priority, in a column "second modified setting" in the row of the reference item "USB device B," in the USB power delivery setting table 121. Further, the CPU 12 writes the values "40 (W)" and "15 (W)," which are the regular operable power for the reference items "USB device A" and "USB device C," in the column "second modified setting" in the rows of the reference items "USB device A" and "USB device C."

Further, the CPU 12 writes the value "10 (W)" indicating the minimum operable power for the reference item "USB device C," which is selected thirdly according to the order of priority; in a column "third modified setting" in the row of the reference item "USB device C," in the USB power delivery setting table 121. Further, the CPU 12 writes the values "40 (W)" and "30 (W)," which are the regular operable power for the reference items "USB device A" and "USB device B," in the column "third modified setting" in the rows of the reference items "USB device A" and "USB device B."

Following S26, the CPU 12 returns to S23 for another round. In S23, the CPU 12 refers to the power consumption/supply table 111 (see FIG. 3) and, if the job received in S21 is a printing job, reads a value of the power required in the printing job, i.e., the value in the column "power (W)" in the row "operable power for printing." The value of the power required in printing may be, for example, as shown in FIG. 3, 250 (W). Next, the CPU 12 refers to the USB power delivery setting table 121 (see FIG. 10) and reads the values in the column "first modified setting" in the rows of the reference items "USB device A," "USB device B," and "USB device C," which are 10 (W) being the minimum operable power, 30 (W) being the regular operable power, and 15 (W) being the regular operable power, respectively. The CPU 12 combines these values "10," "30," "15," with the power required in printing, i.e., "250 (W)" and writes the summed value "305 (W)" in the column "first modified setting" in the row "summed power (W)" in the USB power delivery setting table 121.

Further, the CPU 12 refers to the USB power delivery setting table 121 and reads the values in the column "second modified setting" in the rows of the reference items "USB device A," "USB device B," and "USB device C," which are "40 (W)" being the regular operable power, "10 (W)" being the minimum operable power, and "15 (W)" being the regular operable power, respectively. The CPU 12 combines these values, i.e., "40," "10," "15," with the power required in printing, i.e., "250 (W)" and writes the summed value "315 (W)" in the column "second modified setting" in the row "summed power (W)" in the USB power delivery setting table 121.

Further, the CPU 12 refers to the USB power delivery setting table 121 and reads the values in the column "third modified setting" in the rows of the reference items "USB device A," "USB device B," and "USB device C," which are "40 (W)" being the regular operable power, "30 (W)" being the regular operable power, and "10 (W)" being the minimum operable power, respectively. The CPU 12 combines these values, i.e., "40," "30," "10," with the power required in printing, i.e., "250 (W)" and writes the summed value "335 (W)" in the column "third modified setting" in the row "summed power (W)" in the USB power delivery setting table 121.

Thereafter, the CPU 12 refers to the power consumption/supply table 111 (FIG. 3) to read the value "320 (W)" in the column "maximum power available from power source." Further, the CPU 12 refers to the USB power delivery setting table 121 and reads the values in the columns "first modified setting," "second modified setting," and "third modified setting" in the row "summed power (W)," which are "305 (W)," "315 (W)," and "330 (W)," respectively. The CPU 12 selects one of these values "305 (W)," "315 (W)," and "330 (W)" which is lower than or equal to and closest to "320 (W)," which is the value of the maximum power available from the power source 25.

In other words, the CPU 12 determines that the value "315 (W)" in the column "second modified setting" in the row "summed power (W)" is lower than or equal to and closest to "320 (W)," which is the value of the maximum power available from the power source 25 (S23: YES). The CPU 12 saves the values "40 (W)" being the regular operable power for the reference item "USB device A," "10 (W)" being the minimum operable power for the reference item "USB device B," and "15 (W)" being the regular operable power for reference item "USB device C" in the RAM 13 as the job-executing power delivery mode. Following S23, the CPU 12 may proceed to S29.

According to the MFP 1 in the second embodiment described above, the sum of the value of the power required in the job for printing, scanning, or copying, and the values of the regular operable power to be delivered to the USB devices A 31-C 33, which are connected to the receptacles 19A-19C, may be prevented from exceeding the value of the power available from the power source 25. Meanwhile, the power to be delivered from the power source 25 may be set to a level closest to the maximum power available from the power source 25. Therefore, even with the multiple USB devices A 31-C 33 connected to the receptacles 19A-19C, the operation for printing, scanning, or copying may not be suspended but may be executed so that productivity in the MFP 1 may be improved.

Although examples of carrying out the invention has been described, those skilled in the art will appreciate that there are numerous variations and permutations of the image processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

Below will be described varied examples derivable from the embodiments described above. In the following examples, items or structures which are substantially the same as or similar to those described in the above embodiment may, be denoted by the same reference signs, and description of those may be omitted.

For example, in S25 (see FIG. 6B), the CPU 12 may select one of the USB devices A 31-C 33 corresponding to a reference item, which produces a smallest positive value (see item [5] below), among the reference items "USB device A," "USB device B," and "USB device C, when an excess (see item [4] below) in the sum (see item [2] below) of the values of "regular operable power" for the reference items "USB device A," "USB device B," "USB device C," over the maximum power available from the power source 25 (see item [3] below) to the USB devices A 31-C 33, is subtracted from differences (see item [1] below) between the value of "regular operable power (W) and the value of "minimum operable power (W)" for the reference item "USB device A," "USB device B," "USB device C. The items [1]-[5] will be described more specifically in the following paragraphs.

[1] That is, for example, according to the USB operable power table 112 shown in FIG. 5 in the first embodiment, a difference between the value of "regular operable power (W)" and the value of "minimum operable power (W)" for the reference item "USB device A" is 30 (W) (40 W−10 W=30 W); a difference between the value of "regular operable power (W) and the value of "minimum operable power (W)" for the reference item "USB device B" is 20 (W) (30 W−10 W=20 W); and a difference between the value of "regular operable power (W)" and the value of "minimum operable power (W)" for the reference item "USB device C" is 5 (W) (15 W−10 W=5 W).

[2] Meanwhile, sum of the values of the regular operable power for the reference items "USB device A," "USB device B," and "USB device C" is 85 (W) (40+30+15=85).

[3] In the meantime, according to the power requirement table 111 shown in FIG. 3 in the first embodiment, the power deliverable to the USB devices A 31-C 33 from the power source 25 while a job is being executed is, when the job is a scanning job, 120 W (320−200=120); when the job is a printing job, 70 W (320−250=70); and when the job is a copying job, 20 W (320−300=20).

[4] Therefore, an excess in the total regular operable power for the USB devices A 31-C 33 over the value of the power deliverable to all the USB devices A 31-C 33 is, when the job is a scanning job, "−35 (W)" being a negative value (85−120=−35); when the job is a printing job, "15 (W)" being a positive value (85−70=15); and when the job is a copying job, "65 (W)" being a positive value (85−20=65). In this regard, for the scanning job, no excess is produced; for the printing job, an excess of 15 W is produced; and for the copying job, an excess of 65 W is produced. In other words, if the CPU 12 attempts to control the power source 25 to deliver the regular operable power to each of the USB devices A 31-C 33 while a job is being executed, power may be short for 15 W if the job is a printing job, or for 65 W if the job is a copying job.

[5] Meanwhile, the differences in values between the regular operable power and the minimum operable power for the USB devices A 31-C 33 corresponding to the reference items "USB device A," "USB device B," and "USB device C" are, as mentioned above, 30 (W), 20 (W), and 5 (W), respectively. In this regard, the excess in, for example, the printing job, e.g., 15 (W), may be subtracted from each of the differences 30 (W), 20 (W), and 5 (W). The subtraction may produce 15 (W) for the reference item "USB device A", 5 (W) for the reference item "USB device B," and −10 (W) for the reference item "USB device C." In this regard, the value 5 (W) for the reference item "USB device B" may be the smallest positive value when the excess power of "15 W" for printing is subtracted from the differences between the values of the regular operable power and the minimum operable power. Therefore, in S25, the CPU 12 may select the reference item "USB device B."

Thus, in S26 (see FIG. 6B), the CPU 12 may update the field in the USB power delivery setting table in the row of the selected reference item, e.g., "USB device B," by the value of "minimum operable power (W)" for the selected reference item (see FIG. 5).

Thereby, the sum of the value of the power required in the job for printing, scanning, or copying, and the values of the regular operable power to be delivered to the USB devices A 31-C 33 connected to the receptacles 19A-19C, may be prevented from exceeding the value of the power available from the power source 25. Meanwhile, the power to be delivered from the power source 25 may be set to a level closest to the maximum power available from the power source 25. Therefore, even with the multiple USB devices A 31-C 33 connected to the receptacles 19A-19C, the operation for printing, scanning, or copying may not be suspended but may be executed so that productivity in the MFP 1 may be improved.

For another example, in S12 (see FIG. 4), the CPU 12 may receive the value of "regular operable power," which indicates the amount of power required by the newly connected USB device to operate regularly, alone. In other words, the value of "minimum operable power" may not necessarily be provided to the CPU 12 when the USB device A 31, B 32, or C 33 is newly connected to the receptacle 19A, 19B, or 19C. The CPU 12 may ask the USB devices A 31-C 33 connected to the receptacles 19A-19C for the values of "minimum operable power" when, in S23, the value of "regular setting" corresponding to the "summed power (W)" exceeds the value of "maximum power available from power source" (S23: NO). After receiving the values of "minimum operable power" from the USB devices, the CPU 12 may proceed to S24.

For another example, in S12 (see FIG. 4), the CPU 12 may receive information concerning the newly connected USB device A 31, B 32, or C 33, e.g., information of a manufacturer, a product number, a mode number, from the USB device A 31, B 32, or C 33, and obtain the power information including the values of "regular operable power (W)" and "minimum operable power (W)" concerning the USB device. A 31, B 32, or C 33 from an external server through the internet.

What is claimed is:

1. An image processing apparatus, comprising:
   a memory;
   a power source;
   an image engine including at least one of a print engine and a scan engine;
   an interface configured to communicate with an external device when the external device is connected to the interface, the interface being configured to deliver power from the power source to the external device; and
   a controller configured to:
   detect connection of the external device to the interface;
   receive power information from the external device through the interface, the power information including a value of regular operable power and a value of minimum operable power being smaller than the regular operable power;
   store, in the memory in association with an identifier assigned to the external device connected to the interface, the power information including the value of the regular operable power and the value of the minimum operable power;
   receive a job execution command;
   in response to receiving the job execution command, determine with reference to the power information whether a first power value exceeds a value of power available for the external device during a predetermined operation by the image engine, the first power value including the value of the regular operable power; and
   in response to a determination that the first power value exceeds the value of power available for the external device during the predetermined operation by the image engine, control the power source with reference to the value of the minimum operable power to deliver the minimum operable power to the external device, wherein a plurality of external devices are connectable to the interface, and
   wherein the controller is configured to:
   select one of the plurality of external devices according to a predetermined order, the plurality of external devices being detected to be connected to the interface, in response to a determination that the first power value exceeds a value of the power available for the plurality of external devices during the predetermined operation, the first power value being a sum of values of the regular operable power received from the plurality of external devices; and
   determine the predetermined order based on a difference between the value of the regular operable power and the value of the minimum operable power received from each of the plurality of external devices.

2. The image processing apparatus according to claim 1, wherein the controller is configured to receive the power information from the external device upon detection of the connection of the external device to the interface.

3. The image processing apparatus according to claim 1, wherein the memory stores:
   a second power value indicating a value of power required by the image engine during the predetermined operation; and
   a third power value being greater than the second power value, the third power value indicating a value of power available from the power source,
   wherein the controller is configured to calculate the value of the power available for the external device during the predetermined operation with reference to the second power value and the third power value.

4. The image processing apparatus according to claim 1, wherein, in response to the determination that the first power value exceeds the value of power available for the external device during the predetermined operation, the controller is configured to determine in another round of determining the first power value whether the first power value exceeds the value of the power available for the external device during the predetermined operation, the first power value in the another round including the value of the minimum operable power; and
   wherein, in response to a determination that the first power value in the another round does not exceed the value of the power available for the external device during the predetermined operation, the controller is configured to control the power source with reference to the value of the minimum operable power to deliver the minimum operable power to the external device.

5. The image processing apparatus according to claim 4, wherein the controller is configured to:
  determine, in the another round, whether the first power value exceeds the value of the power available for the plurality of external devices during the predetermined operation, the first power value in the another round being a sum of the value of the minimum operable power received from the selected one of the plurality of external devices and the value of the regular operable power received from a remainder of the plurality of external devices; and
  in response to a determination that the first power value in the another round does not exceed the value of the power available for the plurality of external devices during the predetermined operation, control the power source to deliver the minimum operable power to the selected one of the plurality of external devices with reference to the value of the minimum operable power received from the selected one of the plurality of external devices and to deliver the regular operable power to the remainder of the plurality of external devices with reference to the value of the regular operable power received from the remainder of the plurality of external devices.

6. The image processing apparatus according to claim 4, wherein the controller is configured to control the power source to suspend power delivery to the external device in response to a determination that the first power value including the value of the minimum operable power exceeds the value of the power available for the external device during the predetermined operation.

7. The image processing apparatus according to claim 1, wherein the controller is configured to determine the predetermined order according to magnitude of the difference between the value of the regular operable power and the value of the minimum operable power received from each of the plurality of external devices.

8. The image processing apparatus according to claim 1, wherein the controller is configured to select one of the plurality of external devices that produces a smallest positive value as a result of subtraction, in which an excess in the sum of the values of the regular operable power received from the plurality of external devices over the value of the power available for the plurality of external devices during the predetermined operation is subtracted from each difference between the value of the regular operable power and the value of the minimum operable power received from each of the plurality of external devices.

9. The image processing apparatus according to claim 1, wherein the controller is configured to control the power source to deliver the minimum operable power to the external device from beginning the predetermined operation.

10. The image processing apparatus according to claim 1, wherein, in response to detecting disconnection of the external device from the interface, the controller is configured to delete the power information received from the external device detected to be disconnected from the interface.

11. The image processing apparatus according to claim 1, wherein the controller is configured to:
  in response to the determination that the first power value exceeds the value of the power available for the external device during the predetermined operation by the image engine, determine whether the external device is operating under a setting of the regular operable power;
  in response to a determination that the external device is operating under the setting of the regular operable power, control the power source to deliver the minimum operable power to the external device; and
  in response to a determination that the external device is not operating under the setting of the regular operable power and operating under a setting of the minimum operable power, control the power source to stop delivering the power to the external device.

12. The image processing apparatus according to claim 1, wherein the controller is configured to, in response to the determination that the first power value exceeds the value of the power available for the external device during the predetermined operation by the image engine, control the power source based on magnitude of a difference between the value of the regular operable power and the value of minimum operable power to deliver the power to the external device.

13. A method to control an image processing apparatus comprising a memory, a power source, an image engine including at least one of a print engine and a scan engine, an interface configured to communicate with an external device when the external device is connected to the interface and deliver power from the power source to the external device, and a controller, the method comprising:
  detecting connection of the external device to the interface;
  receiving power information from the external device through the interface, the power information including a value of regular operable power and a value of minimum operable power being smaller than the regular operable power;
  storing, in the memory in association with an identifier assigned to the external device connected to the interface, the power information including the value of the regular operable power and the value of the minimum operable power;
  receiving a job execution command;
  in response to receiving the job execution command, determining with reference to the power information that a first power value exceeds a value of power available for the external device during a predetermined operation by the image engine, the first power value including the value of the regular operable power;
  in response to a determination that the first power value exceeds the value of power available for the external device during the predetermined operation by the image engine, controlling the power source with reference to the value of the minimum operable power to deliver the minimum operable power to the external device; detecting connections of a plurality of external devices to the interface; and
  selecting one of the plurality of external devices according to a predetermined order, the plurality of external devices being detected to be connected to the interface, in response to a determination that the first power value exceeds a value of the power available for the plurality of external devices during the predetermined operation, the first power value being a sum of values of the regular operable power received from the plurality of external devices,
  wherein the predetermined order is configured to be determined based on a difference between the value of the regular operable power and the value of the minimum operable power received from each of the plurality of external devices.

14. The method according to claim 13, wherein the power information is configured to be received from the external device upon detection of the connection of the external device to the interface.

15. The method according to claim 13, further comprising:
calculating the value of the power available for the external device during the predetermined operation with reference to a second power value, the second power value indicating a value of power required by the image engine during the predetermined operation; and
calculating a third power value being larger than the second power value, the third power value indicating a value of power available from the power source.

16. The method according to claim 13, wherein, in response to the determination that the first power value exceeds the value of power available for the external device during the predetermined operation, determining in another round of determining the first power value that the first power value does not exceed the value of the power available for the external device during the predetermined operation, the first power value in the another round including the value of the minimum operable power; and
wherein, in response to a determination that the first power value in the another round does not exceed the value of the power available for the external device during the predetermined operation, controlling the power source with reference to the value of the minimum operable power to deliver the minimum operable power to the external device.

17. The method according to claim 16, further comprising:
determine, in the another round, that the first power value does not exceed the value of the power available for the plurality of external devices during the predetermined operation, the first power value in the another round being a sum of the value of the minimum operable power received from the selected one of the plurality of external devices and the value of the regular operable power received from a remainder of the plurality of external devices; and
in response to a determination that the first power value in the another round does not exceed the value of the power available for the plurality of external devices during the predetermined operation, controlling the power source to deliver the minimum operable power to the selected one of the plurality of external devices with reference to the value of the minimum operable power received from the selected one of the plurality of external devices and to deliver the regular operable power to the remainder of the plurality of external devices with reference to the value of the regular operable power received from the remainder of the plurality of external devices.

18. The method according to claim 13, wherein the predetermined order is configured to be determined according to magnitude of the difference between the value of the regular operable power and the value of the minimum operable power received from each of the plurality of external devices.

19. The method according to claim 13, further comprising:
controlling the power source to deliver the minimum operable power to the external device from beginning the predetermined operation.

20. The method according to claim 13, further comprising:
in response to the determination that the first power value exceeds the value of the power available for the external device during the predetermined operation by the image engine, determining that the external device is not operating under a setting of the regular operable power; and
in response to a determination that the external device is not operating under the setting of the regular operable power and operating under a setting of the minimum operable power, controlling the power source to stop delivering the power to the external device.

21. The method according to claim 13, further comprising:
in response to the determination that the first power value exceeds the value of the power available for the external device during the predetermined operation by the image engine, controlling the power source based on magnitude of a difference between the value of the regular operable power and the value of minimum operable power to deliver the power to the external device.

22. A non-transitory computer readable medium storing computer readable instructions that are executable by a computer in an information processing apparatus comprising a memory, a power source, an image engine including at least one of a print engine and a scan engine, and an interface configured to communicate with an external device when the external device is connected to the interface and deliver power from the power source to the external device, the computer readable instructions, when executed by the computer, causing the computer to:
detect connection of the external device to the interface;
receive power information from the external device through the interface, the power information including a value of regular operable power and a value of minimum operable power being smaller than the regular operable power;
store, in the memory in association with an identifier assigned to the external device connected to the interface, the power information including the value of the regular operable power and the value of the minimum operable power;
receive a job execution command;
in response to receiving the job execution command, determine with reference to the power information whether a first power value exceeds a value of power available for the external device during a predetermined operation by the image engine, the first power value including the value of the regular operable power;
in response to a determination that the first power value exceeds the value of power available for the external device during the predetermined operation by the image engine, control the power source with reference to the value of the minimum operable power to deliver the minimum operable power to the external device;
detect connections of a plurality of external devices to the interface;
select one of the plurality of external devices according to a predetermined order, the plurality of external devices being detected to be connected to the interface, in response to a determination that the first power value exceeds a value of the power available for the plurality of external devices during the predetermined operation, the first power value being a sum of values of the regular operable power received from the plurality of external devices; and determine the predetermined order based on a difference between the value of the regular operable power and the value of the minimum operable power received from each of the plurality of external devices.

23. The non-transitory computer readable medium according to claim 22, wherein the computer readable instructions, when executed by the computer, further cause the computer to:

in response to the determination that the first power value exceeds the value of the power available for the external device during the predetermined operation by the image engine, determine whether the external device is operating under a setting of the regular operable power;

in response to a determination that the external device is operating under the setting of the regular operable power, control the power source to deliver the minimum operable power to the external device; and in response to a determination that the external device is not operating under the setting of the regular operable power and operating under a setting of the minimum operable power, control the power source to stop delivering the power to the external device.

24. The non-transitory computer readable medium according to claim 22, wherein the computer readable instructions, when executed by the computer, further cause the computer to, in response to the determination that the first power value exceeds the value of the power available for the external device during the predetermined operation by the image engine, control the power source based on magnitude of a difference between the value of the regular operable power and the value of minimum operable power to deliver the power to the external device.

* * * * *